(12) United States Patent
Adams et al.

(10) Patent No.: US 6,563,563 B2
(45) Date of Patent: *May 13, 2003

(54) PRINTING OF IMAGE WITH RELATED SOUND

(75) Inventors: Guy de Warrenne Bruce Adams, Stroud (GB); David Mark Frohlich, Bristol (GB); Malcolm Stuart Rix, San Diego, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,526

(22) Filed: Jul. 7, 1999

(65) Prior Publication Data

US 2002/0075464 A1 Jun. 20, 2002

(30) Foreign Application Priority Data

Jul. 8, 1998 (EP) .............................................. 98305436

(51) Int. Cl.$^7$ .......................... G03B 27/50; G03B 17/24

(52) U.S. Cl. ......................... 355/31; 396/312; 396/321

(58) Field of Search ..................... 355/31, 27; 396/312, 396/321, 318; 358/1.9; 347/2; 434/309, 311

(56) References Cited

U.S. PATENT DOCUMENTS

| | | | |
|---|---|---|---|
| 4,270,853 A | 6/1981 | Hatada et al. | 396/33 |
| 4,270,854 A | 6/1981 | Stemme et al. | 396/33 |
| 4,400,457 A | * 8/1983 | Johnson | 430/140 |
| 4,905,029 A | 2/1990 | Kelley | 396/312 |
| 4,983,996 A | 1/1991 | Kinoshita | 396/312 |
| 5,128,700 A | 7/1992 | Inoue et al. | 396/312 |
| 5,276,472 A | 1/1994 | Bell et al. | 396/312 |

(List continued on next page.)

FOREIGN PATENT DOCUMENTS

| | | |
|---|---|---|
| BE | 1001348 A6 | 10/1989 |
| EP | 0 670 555 A1 | 9/1995 |
| EP | 0 827 018 | 3/1998 |
| EP | 0 851 281 | 7/1998 |
| JP | 62-184687 | 8/1987 |
| JP | 9-138741 | 5/1997 |
| WO | 95/14958 | 6/1995 |

OTHER PUBLICATIONS

Abstract of JP-62-184687 published Aug. 13, 1987, *Patent Abstracts of Japan*, 1 page.
Abstract of JP 9-138741 published May 27, 1997, *Patent Abstracts of Japan*, 1 page.
"Palm Products: Expansion Cards," Palm, Inc., 2 pages, located at internet address <http://palm.com>, accessed May 2002.
Hoshino, Y., "The Talking Book," *Penrose Annual* (London, Lund Humphries, 1959) p. 57.
"Video Postcard" idea of Philips Electronics N.V. Http://www–eur.philips.com/design/vof/vofsite7/postcard/index.htm.

*Primary Examiner*—Rodney Fuller

(57) ABSTRACT

A printer 802 is adapted to produce a printed image with an associated sound passage stored on an electronic storage device. The printer 802 comprises an information input for receiving information to define a visual image and also information defining a passage of sound. The printer has a printer element 808 for printing the first information as a printed image 804, but also has a writing element 807 for writing the sound information into an electronic storage device 803 adapted for attachment to the printed image. An appropriate mechanism 805 for attaching the electronic storage device to the printer image is provided at the printer.

33 Claims, 8 Drawing Sheets

U.S. PATENT DOCUMENTS

| | | | | |
|---|---|---|---|---|
| 5,480,156 A | * | 1/1996 | Doederlein et al. | 273/237 |
| 5,574,859 A | | 11/1996 | Yeh | 395/200.01 |
| 5,671,555 A | * | 9/1997 | Fernandes | 40/124.03 |
| 5,692,225 A | * | 11/1997 | Bernardi et al. | 396/318 |
| 5,771,414 A | * | 6/1998 | Bowen | 396/312 |
| 5,774,752 A | * | 6/1998 | Patton et al. | 396/312 |
| 5,878,292 A | * | 3/1999 | Bell et al. | 396/312 |
| 6,072,980 A | * | 6/2000 | Manico et al. | 434/317 |
| 6,102,505 A | * | 8/2000 | McIntyre et al. | 347/2 |

* cited by examiner

PRINTING OF IMAGE WITH RELATED SOUND

FIELD OF THE INVENTION

The present invention is relevant to to a system for the provision of images with related sound. In particular, the present invention relates to a printer adapted both for the printing of images and for the recording of sound on to appropriate media.

DISCUSSION OF PRIOR ART

There are a number of widely used media (films, video) for provision of sound and images together in a concurrent continuous way, but there has been less success in the provision together of still images with associated passages of sound. This is despite the fact that this has been identified as a desirable combination for at least forty years. An early solution was the Synchrosheet technology, developed by Tokyo Denki KKK, the Tokyo Institute of Technology, the Dai Nippon Printing Company and the Canon Camera Company. This technology is described in an article by Yasushi Hoshino entitled "The Talking Book" in The Penrose Annual, Lund Humphries, London, 1959. This technology involved use of a paper sheet coated with magnetic film on which sound was recorded in spiral tracks using magnetic recording heads. A large and relatively complex reader was required to read the sound tracks.

Alterative approaches have been adopted in subsequent work. U.S. Pat. Nos. 4,270,853 and 4,270,854 both relate to instant printing cameras which also record a magnetic strip at a marginal portion of the film for recording sound. European Patent Application Publication No. 0670555 A1 and U.S. Pat. No. 4,983,996 both relate to sound storage appended to images by optical means: in the former case, by a dot code, and in the latter case, by a bar code. U.S. Pat. No. 5,128,700 also teaches the use of a bar code in this context, but here the bar code does not itself contain the sound information: the bar code merely contains a reference to sound stored on another media so that a sound reader can determine the reference from the bar code and play the referenced passage of sound from a dedicated sound storage medium. U.S. Pat. No. 5,276,472 also teaches use of bar codes on a photographic print as a sound storage medium, and further suggests features of relief (blister marks) as an alternative. U.S. Pat. 4,905,029 discusses the idea of using "acoustic recording media" associated with photographic images to store related sound—alternatives involving chip storage are discussed also but these arc stated to be "not currently practical".

A more complex approach to this design space is found in the "Video Postcard" idea of Philips Electronics N.V., disclosed on World Wide Web site http://www eur.philips.com/design/vof/vofsite7/postcard/index.htm. This proposal concerns a piece of film with an embedded chip which stores a sound and video clip. The image display provision within the "Video Postcard" is thus specific and complex, unlike a conventional printed image.

Proposals for realising attachment of sound to still images are also found in European Patent Application Publication No. EP 0827018 A1 (which teaches an image player with which "image-audio prints" can be engaged to play sound), International Patent Application Publication Number WO 95/14958 and Belgian Patent Application Publication Number 1001348A6. European Patent Application Publication Number 0851281 is relevant to photographic processing for media capable of supporting this type of information.

Despite such a long standing interest in the possibility of provision of still images together with relevant passages of sound, no technology has been satisfactorily commercialised for this purpose. There is thus a need for technology which achieves provision of passages of sound with still images such that the sound and images together are cheap and convenient to produce, that playback of the sound is cheap and easy to accomplish, and so that both image and sound can be rendered at sufficiently high quality to satisfy a user.

There is a particular requirement for a device adapted both to provide printed images cheaply and conveniently, and also to provide effective and versatile transfer of sound information to an appropriate recording medium, to allow a user to use this technology easily and effectively.

SUMMARY OF INVENTION

Accordingly, the invention provides a printer, comprising: an information input, adapted so that the printer can receive first information defining a visual image and second information defining a passage of sound; a printer element for printing the first information as a printed image; and a writing element for writing the second information into an electronic storage device adapted for attachment to the printed image.

A printer with this functionality is a key component in a flexible, versatile and cheap solution to the production of still images with associated recorded sound. The differences between such a printer and a conventional document printer (such as a typical personal or network inkjet or laser printer) are not great—it is desirable that printers according to the invention are able also to function as conventional document printers—and can be achieved without drastic mechanical redesign or added cost.

Preferably such a printer contains a mechanism for attaching electronic storage devices to the printed image (unless the image is printed on paper in which the electronic storage device is pre-embedded)—it is desirable for this mechanism to operate automatically when a Combined image and sound "audioprint" is scheduled for printing.

It is desirable for there to be a delivery mechanism for storing unwritten electronic storage devices, and for delivering them to the writing element for writing when required. The unwritten devices can usefully be provided on a bandolier, or as cartridges. It is useful (particularly in the case of automatic attachment) for the electronic storage devices to be self adhesive with a non-adhesive backing removed somewhere between storage and attachment.

Modified printers can act as "photocopiers" for audioprints: they can scan a printed image and read the sound file from an attached or otherwise associated electronic storage device, and then "print" out the scanned image and the sound file together. A further modification is to allow the printer to read (and perhaps play back) sound files in isolation, or to write sound flies to electronic Storage devices without the printing of any associated image.

A further useful feature is further information relevant to the image or to the sound passage to be stored together with the sound passage in the electronic storage device. This may usefully be a version of the image. Such further information may be received along with the image and sound file, or may be at least in part entered by the user at the printer. The printer may also usefully display some or all of this further information (for examples a thumbnail version of the image).

DESCRIPTION OF DRAWINGS

Embodiments of the invention are described further below, by way of example, with reference to the accompanying drawings, in which.

SPECIFIC DESCRIPTION OF PREFERRED EMBODIMENTS

Figure 1:
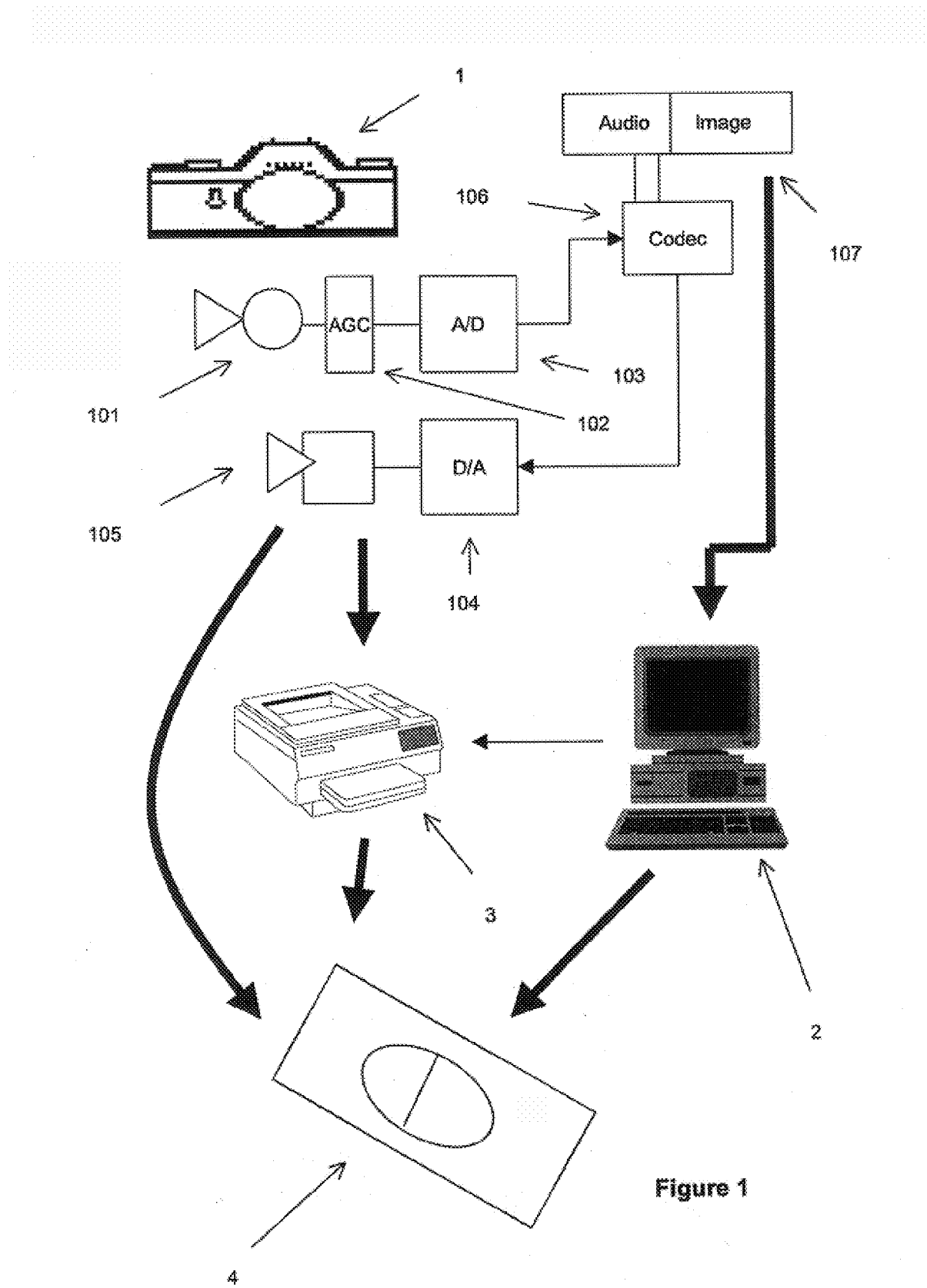
FIG. 1 shows the components for the process of recording, providing and playing passages of sound together with still images in a system suitable for the employment of embodiments of the present invention.

Basic components in a system for providing an image and related sound are shown in FIG. 1. A camera 1 comprises conventional means for capturing a still image together with means for recording a passage of sound. Sound recording means are conventional: a microphone 101 and an automatic gain controller 102 (in digital embodiments, such as is specifically shown in FIG. 1, an analog/digital converter 103 and a codec 106 are also required)—where playback is also available, a loudspeaker 105 (and, if digital, a digital/analog converter 104) must also be provided. Typically a memory 107 for storage of audio and image information will also be required.

It should be noted that although the term "image" is used here, it does not refer merely to a pictorial image. It may also relate to, for example, text captured in an image format. Likewise, when the term "camera" is used, other devices for capturing a still image (such as a scanner) can be understood to fall within its scope in the present context.

Alternatively, sound can be added separately from capture of the image (eg in later annotation) and thus facility for sound capture need not be provided at the camera 1 in certain versions of this system. However, provision of sound capture at the camera 1 is desirable as it enables modes of use to be employed that certain users find to be of particular value, such as the capture of ambient sound associated with the capture of a particular still image (e.g. associated conversation, or sounds associated with the photograph location). It also allows for annotation in situ on capture of the image.

This process of image and sound capture may be entirely analog, in which case both an analog image recording medium (such as film) and an analog sound recording medium are provided at the camera. Either at the camera 1, or separately, the analog image is printed (or rendered in some other tangible form) and the passage of sound is stored in an electronic storage device attached to the printed image.

Alternatively, image and sound capture may be entirely digital, with both image and sound digitized on capture and stored in an appropriate storage medium (for example, on an Iomega "Clik" disk ("Clik" is a trade mark of Iomega Corporation) or on a Sandisk "Compactflash." storage device ("Compactflash" is a trade mark of Sandisk). In this event, the digital data can be provided to a digital processing means (such as personal computer 2). This is advantageous, as it allows for easy editing of both image and sound data. The image data can then be provided from the digital processing means as a printed image, and the passage of sound attached thereto in a digital electronic storage medium, such as a flash memory. This is best achieved by means of a printer 3. In printer 3, the image is printed in conventional manner and a sound reproduction device with the passage of sound recorded thereon is attached to the image—advantageous construction of such a printer 3 is described further below. Advantageously, recording and attachment of sound is done in the printer itself, but this step may be carried out separately (for example, at the sound recording device 4, as is described further below). Alternatively, it is possible in some versions of the system for the image data and optionally the sound data to be provided directly from the camera to the printer (for example by infra red data transfer using technologies currently known for infra red printing from personal computers—such as under the IrTranP standard): these arrangements may require the processor in camera 1 to be provided with a printer driver for the appropriate printer.

Alternatively, the processes followed may be part analog and part digital (for example, digital sound recording but analog image production, with the electronic storage medium with sound stored therein attached in due course to the analog-produced image).

In each case, the result is a tangible representation of the image with an electronic storage medium having the passage of sound recorded thereon attached to it this is here termed an "audioprint". To play the passage of sound, sound reproduction device 4 is employed. This can be connected to the electronic storage medium to enable information stored in the electronic storage device to be transferred to the sound reproduction device, the sound reproduction device 4 containing means to convert the information received from the electronic storage device into the passage of sound. However, sound reproduction device 4 is adapted to be detachable or otherwise remote from the printed image when no connection between the electronic storage device and the sound reproduction device is required.

As the person skilled in the art will appreciate, the system of FIG. 1 could be expanded or modified by use of different components with different or expanded functionality, or by appropriate communication mechanisms between the components. Any component with appropriate functionality for capture, writing of sound or images, or for playback of sound, could in potential be used, as could any component type that could be effectively modified for such a purpose or to include such a purpose along with its existing functionality. If appropriate communication mechanisms were present, any appropriate communication type or path could be used between appropriate system components. For example, using a protocol such as JetSend (developed by the present applicant and described at http://www.jetsend.hp.com/JSHome.html) direct communication between a camera and a printer; or any other pair of JetSend enabled appliances, to transfer image or sound content or both in an appropriate negotiated form would be possible. Other possibilities could include using facsimile as a way to transfer information for printing—essentially any appropriate communication protocol could be used.

Figure 2A:
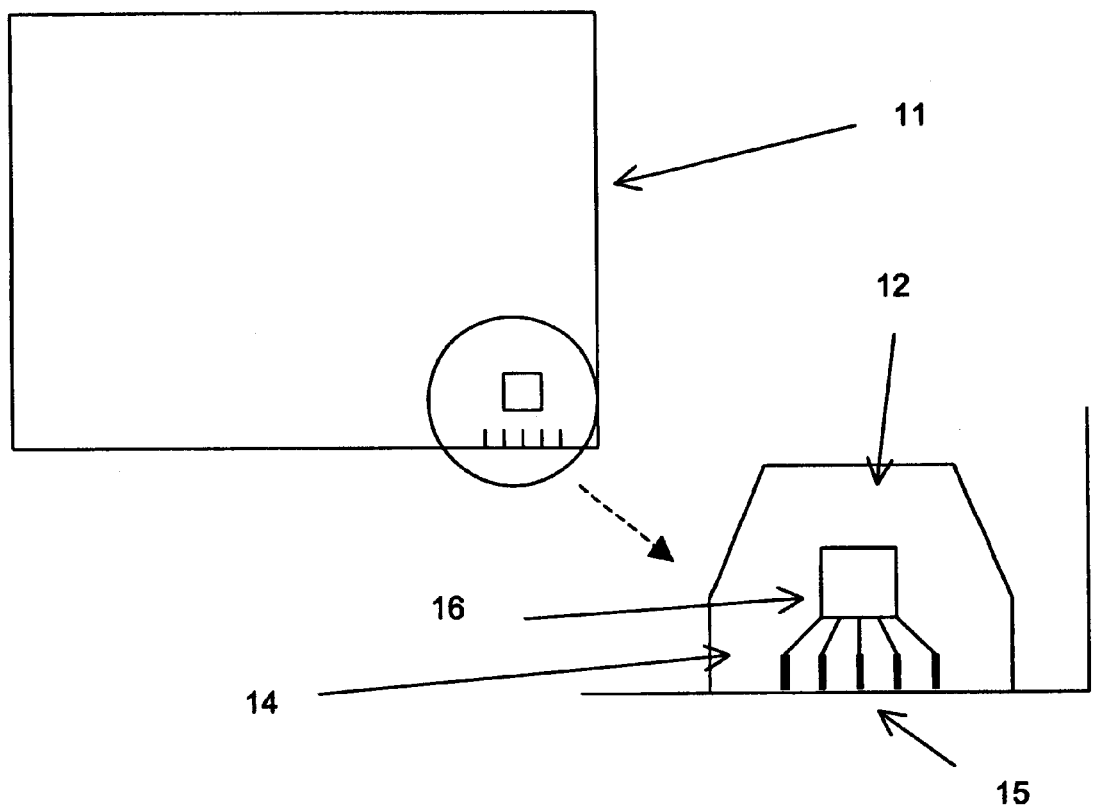
FIGS. 2a and 2b show, in plan view (with detail) and side elevation respectively, the physical arrangement of an electronic storage device onto a printed image in the system of FIG. 1.
Figure 2B:
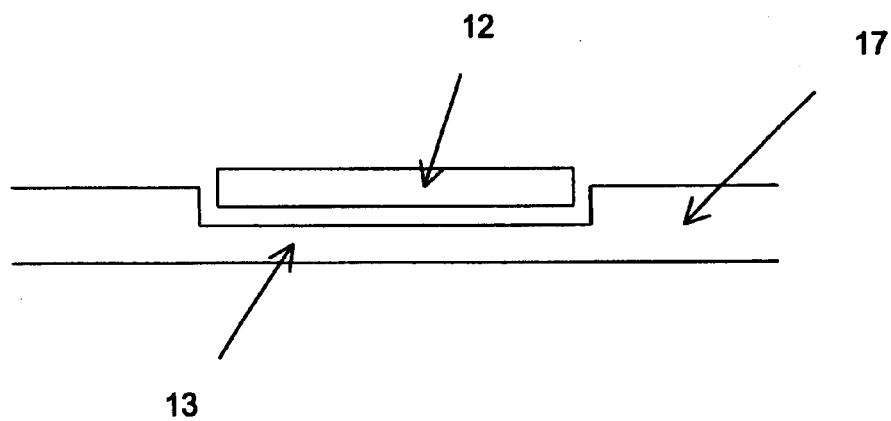

Not shown in FIG. 1 is the tangible image and the electronic storage medium. This is illustrated in FIGS. 2a and 2b. FIG. 2a shows an image 11 in a tangible form: in this case a printed image. Attached to the image 11 is an electronic storage device 12. The electronic storage device comprises in this case a die 16 containing a memory (which may be for example a flash memory, or another form of EEPROM or PROM) in which the passage of sound is recorded, the die 16 being connected by tracks to connectors 15. The die 16, the tracks and the connectors 15 are all mounted on a flexible substrate 14, the flexible substrate being a membrane, advantageously of a plastics material.

FIG. 2b shows one particularly advantageous arrangement for reproducible location of the electronic storage device 12 with respect to the tangible image 11. This is for the image 11 to be printed on paper 17 provided with a recess 13. A particularly appropriate form for the recess is as a slot at the edge of the paper sheet with a depth roughly equal to the thickness of the storage device. This leaves the resulting image 11 in a form which is particularly easy to handle (no more difficult than a conventional photographic print, or a sheet of paper).

Figure 3A:
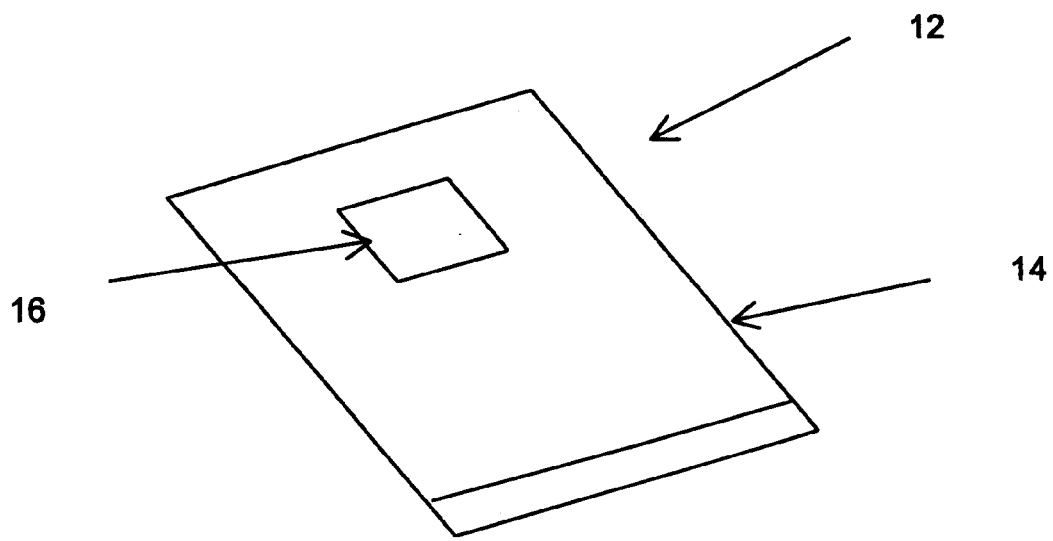
FIGS. 3a and 3b show in plan view and side elevation respectively the mounting of an electronic storage device on to a flexible substrate to provide a device usable in the arrangement of FIG. 2.
Figure 3B:
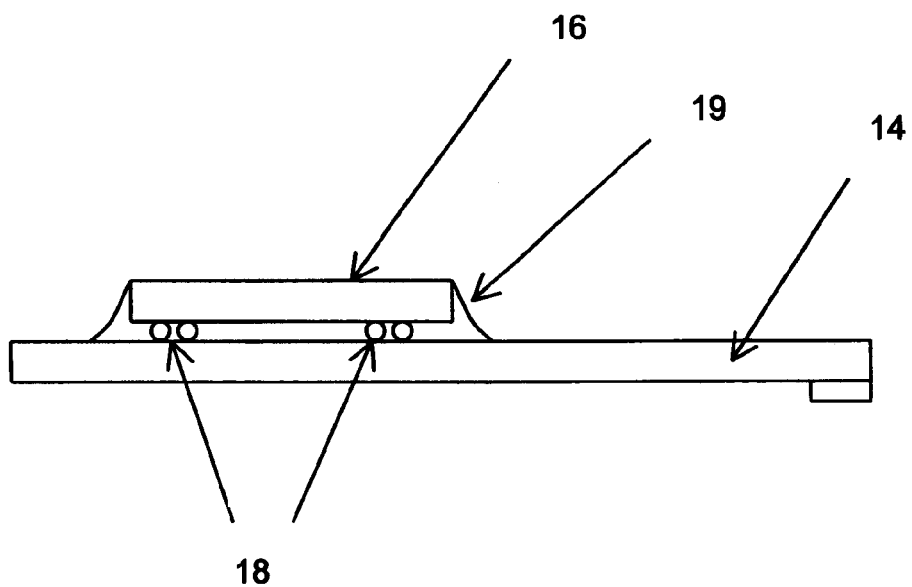

The construction of a particularly suitable electronic storage device, here termed an audiotab, is shown in FIG. 3a. Die 16 contains a memory device—advantageously a flash memory or other non-volatile EEPROM, though another form of PROM could provide a suitable alternative. As shown in FIG. 3b, die 16 is fixed to the flexible substrate 14 by a number of solder bumps 18 to establish electrical connection between the die 16 and the conducting tracks on the substrate 14, and an insulating material is provided as a fill 19 to bind the die 16 into a common structure with the substrate 14. As previously indicated, it is desirable for the substrate 14 to be flexible: it is desirable that the substrate is at least of comparable flexibility to the printed image 11, otherwise the chance of the electronic storage device becoming detached increases significantly and the printed image will become more difficult to handle.

In the embodiment shown, connections to the audiotab are made by contact with a device (generally the sound reproduction device) abutting the edge of the printed image 11 in some way. Other forms of connection are quite possible. For example, connection could be made by surface contact, rather than by an edge connection of this type. Alternatively, signals and power could be transmitted without direct contact (signals by a variety of means, power typically by induction). It should also be noted that although connections to the audiotab for both signal and power are provided together (in preferred embodiments the audiotab will have no source of power itself but will draw power from a device accessing it). This is not a necessary feature of the invention, and the two could be provided through different connectors, for example.

Also possible are different types of audiotab construction. For example, it may be possible to print appropriate circuitry directly on to an appropriate substrate material, removing the need for a chip (and hence for the mounting of the chip on to the substrate).

Each element of a preferred version of the system here described will now be discussed in greater detail, both with regard to its construction and to its function. Information flow between elements of the system is also discussed. There are a number of particularly advantageous design options associated with the different elements of the system, some of these options being appropriate to certain overall uses of the system or components of the system, and some to others.

These options are described with regard to the system element to which they relate, and where appropriate will be further described in the context of modified systems discussed further below. The role of the present invention in the context of such a system will be described.

The camera 1 is adapted in different embodiments of the invention to capture images in various different, but conventional, ways. It preferred arrangements, the image will be captured and stored as a digital representation as in a conventional digital camera. However, arrangements are also available where the image is prepared by an analog route—in which case the image may be recorded on to conventional photographic film, or produced as an instant printed image (Land camera). In such analog arrangements, sound is handled separately, and image and sound information Lake different processing routes until the tangible image and the electronic storage device are assembled together.

Where camera 1 differs from a conventional camera is that it also contains means for recording a passage of sound. This feature is known from and discussed in various of the prior art documents mentioned earlier in the application. Essentially all that is required is that a microphone 101 and a sound recording apparatus are provided, with certain basic controls and displays: means to start and stop recording and to associate a specific recording with a specific image, and preferably means to display when a given recording is in progress and means for sound playback. Optional features are that recording could be synchronised with taking of a picture (starting or stopping at the point of image capture, or with image capture occurring at a predefined point dig sound capture)—other conventional sound recording features (stereo, noise reduction etc.) may also be provided. Advantageously, sound is recorded digitally and held in an appropriate storage medium. In preferred arrangements, both sound and images are recorded on the same digital storage medium (for such digital storage an Iomega "Clik" disk would be an appropriate choice), but in alternative arrangements sound and image can be handled through separate media (for example, if the image is recorded on film). Alternatively, the electronic storage medium for attachment to the tangible image could be recorded directly at the camera: this would be appropriate for a Land camera arrangement, for example. Discussion of recording on to an appropriate electronic storage medium will be discussed further at a later point.

In addition to recording capability, the camera 1 may also have the function of a sound playback device capable of reproducing sound from the information stored in the electronic storage medium attached to the tangible image. Again, the necessary functionality is indicated below in the discussion of sound playback device 4.

For digital image or sound data, the next stage is signal processing by a signal processing device, which in appropriate embodiments will be a personal computer 2. Again, substantially any conventional image processing software may be used for editing or otherwise processing a digital image; likewise, conventional software is available for editing or otherwise changing the associated passage of sound. Examples of appropriate conventional software are Creative Wave Studio, Studio M (a product of Gold Disk, Inc.) and Adobe Premiere.

In the system of FIG. 1, the processed digital data in personal computer 2 can then be handled independently: the image can be sent to a printer 3, and the sound to a device for recording sound on to the chosen electronic storage medium, with consequent assembly (manual or otherwise) of the printed image and the electronic storage medium together. The audiotab recording could then take place in the sound reproduction device (discussed further below), by an attachment or peripheral to the personal computer 2, or by a separate storage appliance with the capacity to store sound clips and record audiotabs with the stored clips. Such a storage appliance could also comprise means to archive sound clips (and any further recorded information, such as images, and to provide means to recover on request sound clips and any related information from the storage appliance.

In embodiments of the present invention, the printer 3 has both the function of printing the image and of transferring the passage of sound on to the electronic storage medium. The personal computer 2 is adapted to send image information to the printer for printing in conventional manner: however a way is also provided for the associated file containing the passage of sound to be provided too (this is easily accomplished by use of a file format with an extension for sound)). Hence before or after the image is printed, the sound file is also transmitted to the printer, and the sound and image information can he provided to the printer through a conventional information input for a printer. Means are provided at the printer for writing the sound file on to the electronic storage medium in an essentially conventional manner for writing electronically stored information to a memory.

Figure 7A:
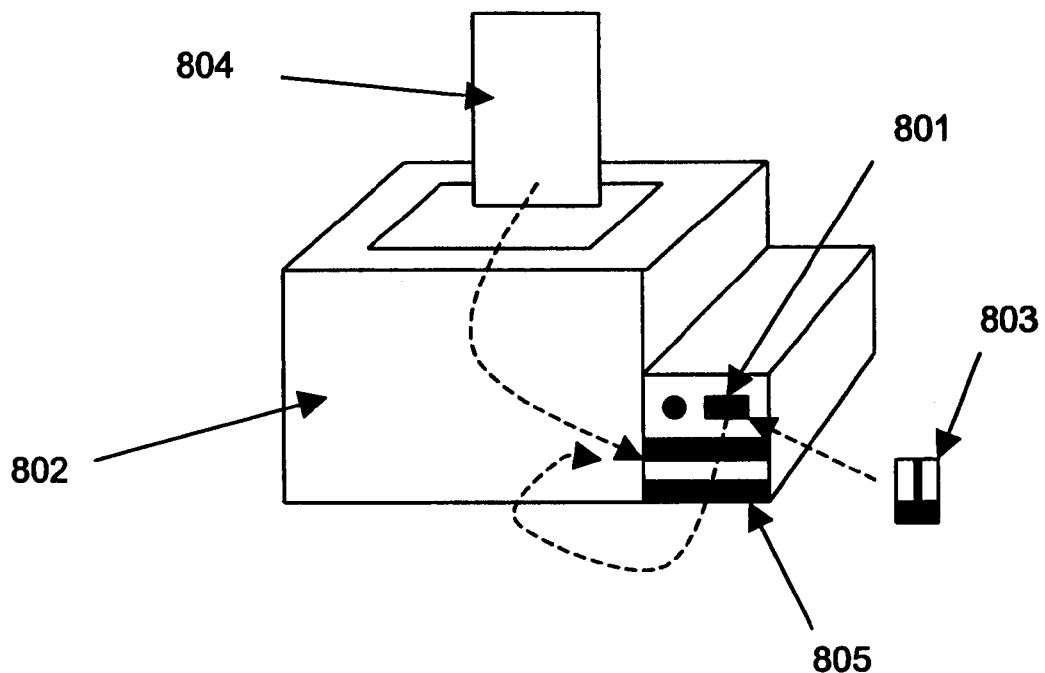
FIGS. 7a to 7c relate to a printer particularly suitable for use in the system of FIG. 1.
Figure 7B:
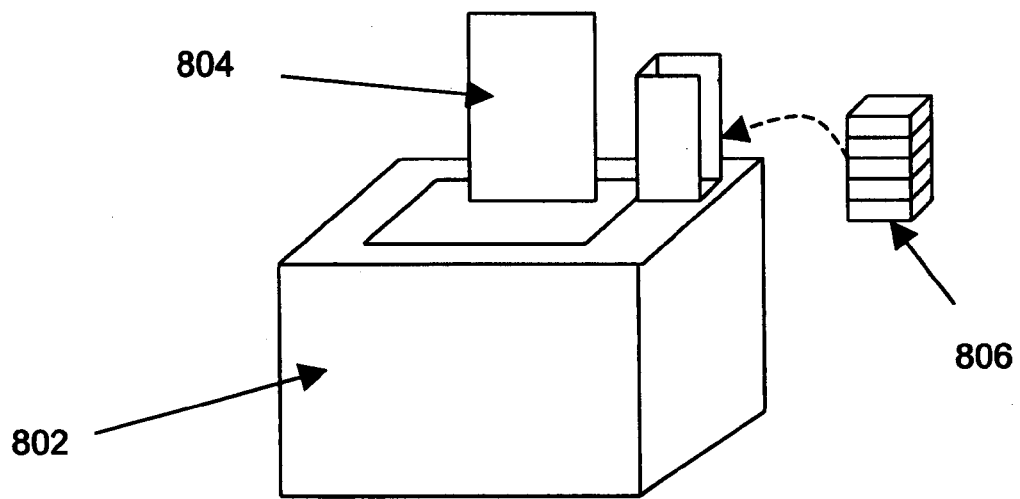

The mechanically simplest solution, shown in FIG. 7a, is to provide a discrete interface 801 at the printer 802 into which a blank sound storage device 803 could be slotted so that it can then be operated on by the writing element 807, the storage device then being removed after recording and fixed by the user to the printed image 804 produced by the printing element 808 (a separate fixing menu could be provided at the printer, such as an embossing head 805, so that the printed image 804 aid the sound storage device 803 could be fixed together by a user after each was, separately, produced). Alternatively, as shown in FIG. 7b, means could be provided whereby the printer 802 could be loaded with a supply of blank sound storage devices, a single sound storage device being recorded with a passage of sound on printing of an associated printed image. In the version shown in FIG. 7b, the blank devices are provided in the form of cartridges 806, but could also be provided in the form of a bandolier, for example. It is desirable to be able to pre-load the printer with a number of blank devices, as this minimises user intervention, particularly in arrangements which allow for batch downloading and printing of a number of clips.

Figure 7C:
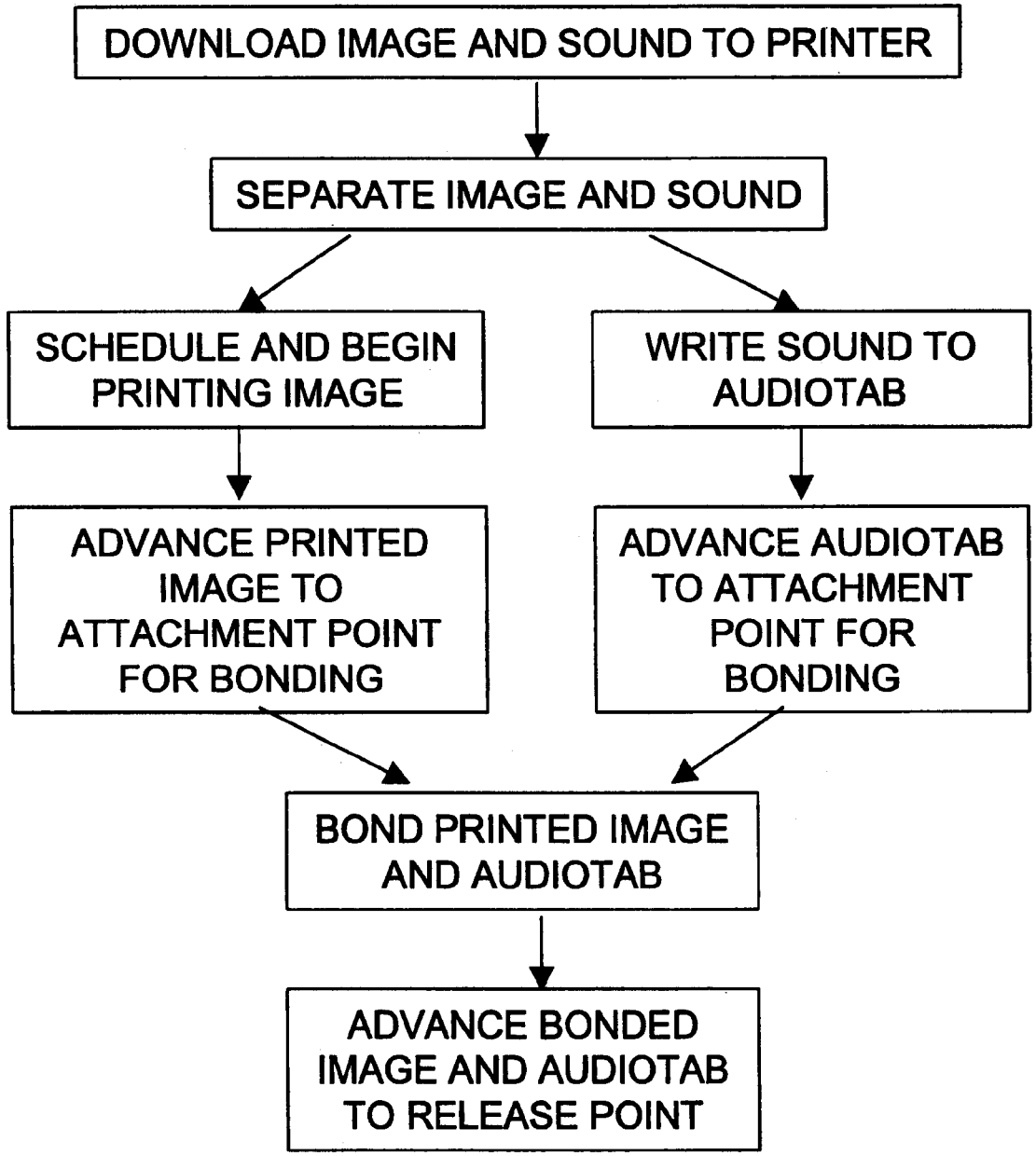

A particularly preferred form of this arrangement includes automatic paper handling to hold the printed image and to fix the associated sound storage device on to the printed image: the image and attached sound are thus output from the printer 3 without manual intervention from the user. In a particularly effective solution, a specific path is provided for sound storage device substrates in the printer mechanism. This path could be designed for single substrates, but a more efficient mechanism would be provided for substrates provided in cassette or bandolier form. The bandolier solution is effective for self-adhesive substrates, as it is straightforward then to use a substrate path in which the tape is peeled away, shortly prior to substrate attachment, to reveal the self-adhesive surface. The printer path could provide for indentation of the print medium before die attachment (alternatively, pre-indented paper for accommodation of audiotabs could be pre-loaded into the printer). The printer and substrate path then run together to an attachment point, at which both the print medium and audiotab substrate are held in position, then fixed together by appropriate mechanical action (e.g. pressed together under solenoid action). Appropriate process steps are shown in FIG. 7c.

In printers which did not support such automatic paper handling, there would need to be also some mechanism for reconciling a printed audiotab with a printed image (particularly if multiple audiotabs can be recorded). This could be, for example, a numbered symbol printed on tee page which corresponded to a numbering of the audiotab. Another approach which could be used if a version of the image was electronically stored on the audiotab (see below) would be to display a thumbnail of the image relating to an audiotab to be dispensed on a printer display.

Modifications required to existing printer structures are not so fundamental that they would pose particular difficulty to a person skilled in state of the art printer construction Modification to existing communication with printers to support additional functions also poses no fundamental difficulty—standard languages used for the purpose, such as PCL, could readily be extended with special commands recognised by the printer (such commands could for example be placed in a comments field, so that they will be ignored by printers unable to produce audiotabs), Further developments to printers of this type can be provided. If the printer 3 possesses not only a means for writing audiotabs, but also a means for reading audiotabs (ie it includes the functionality of reader device 4 in this respect, perhaps without need for audio playback), and the printer 3 is adapted to act as a photocopier, then the printer 3 as a whole may be adapted to act as an audioprint photocopier: both a printed image and an attached audiotab may be copied (probably in a separate copying process, but possibly at the same time if the overall printer design allows for the various printer components to be located appropriately) and a new print and associated audiotab provided. A farther possibility is for the printer to record audiotabs alone (without images) if required—possibly from sound recorded at a reader device 4, or if appropriate circuitry is provided, at the printer 3 itself. The printer 3 then may permit stand alone audio capture, recording into an audiotab, and replay, all to be carried out.

Figure 6:
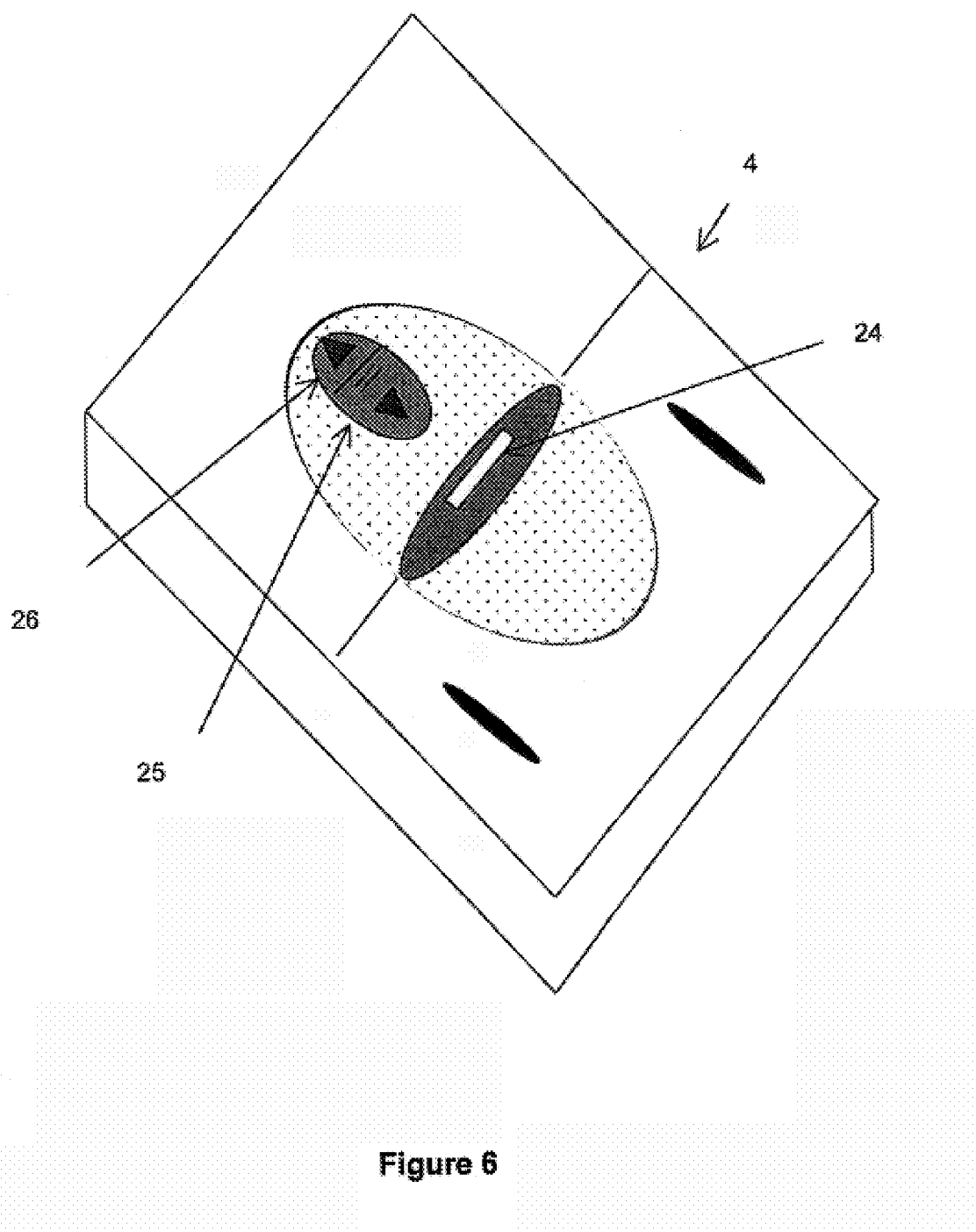
FIG. 6 shows a sound reproduction device for reproducing a passage of sound held on an electronic storage medium suitable for use in the system of FIG. 1.

The sound reproduction device 4 will now be described with reference to FIG. 6. Sound reproduction device 4 has a slot 24 adapted to receive connectors 15 of the electronic storage device 12. This allows access to the memory in the electronic storage device, and hence to the passage of sound, by he sound reproduction device 4 The reproduction device has user operable switches in the embodiment shown in FIG. 6, there is a play/stop button 25 and a rewind button 26. Sound reproduction device 4 also comprises a loudspeaker. Further functional features normal in sound reproduction devices can also be provided: for example, a headphone/earpiece connection, a fast forward button and a volume control Capability can also be provided for recording passages of sound on to the electronic storage device at the sound reproduction device 4. The passage of sound recorded on to the electronic storage device can then be modified or replaced at the sound reproduction device 4. The circuitry necessary for sound reproduction device 4 is discussed further below together with associated features of the audiotab.

In different arrangements, sound is provided from the camera 1 directly to the sound reproduction device 4 (perhaps through a temporary storage on a different storage medium, or simply from a standard audio output), with the initial recording of sound on to the electronic storage device taking place at the sound reproduction device, either before or after the fixing of the electronic storage device to the printed image Alternatively, this direct connection can be from the personal computer 2 to the sound reproduction device 4, with recording of the audiotab at the sound reproduction device 4. Sound can be processed in the personal computer 2 as indicated above with conventional software, and then sent to the sound reproduction device 4 for subsequent audiotab recording. Another variant that effectively combined features is for camera 1 and sound reproduction device 4 to be the same object: this is a practical approach as sound recording and playback capability are also present in the camera. Likewise, alternative arrangements employ personal computer 2, with appropriate peripheral circuitry, as sound reproduction device 4.

Figure 4:
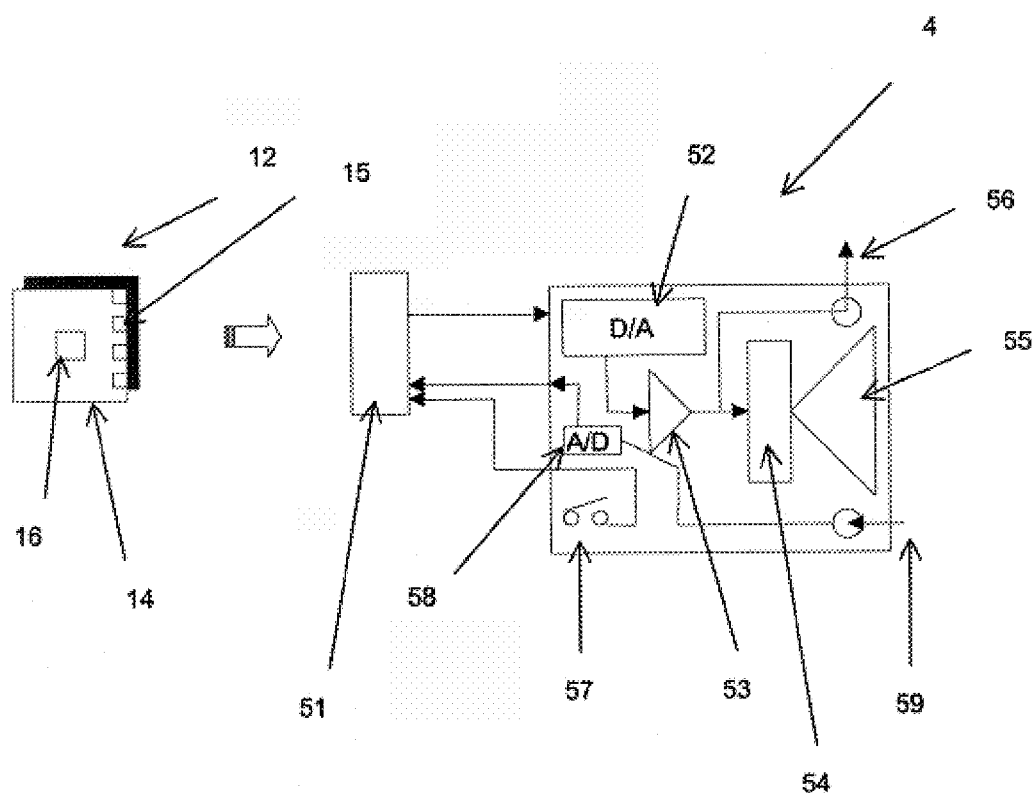
FIG. 4 shows schematically the components required for playback of a passage of sound held on an electronic storage medium as a digital signal in an example of a system as shown in FIG. 1.

The circuitry of the electronic storage device and the sound reproduction device will now be describe. Other circuitry, and programs, are essentially conventional and the person skilled in the art will be well aware of the choices tat are available A digital solution for sound reproduction from sound stored on the electronic storage device is shown in FIG. 4. Die 16 of the electronic storage device 12 contains a non-volatile memory. In a preferred design choice, electronic storage device 12 is a CMOS device having an on-chip oscillator, a high density flash memory storage array, a serial interface, a write buffer and an address decoder. The bondout pitch of die 16 is expanded by the tracks on the substrate 14 to provide a connector 15 which can readily interface with an appropriately matched connector 51 of the sound reproduction device 4. At this connector, a separate connection may be provided for every input and output required (signal, power) or alternatively these may be combined with appropriate conventional additional circuitry (for example, the signal may be provided by modulation of the power connection, in which case a modulator/demodulator circuit is also required). The arrangement shown in FIG. 4 shows direct access to the memory in die 16 by the sound reproduction device and direct playing of the sound recording device: an alternative solution is for appropriate means to be provided to first download some or all of the information stored in the memory on die 16 to a separate memory in the sound reproduction device 4 for fast access by the reproduction device. As the sound is recorded in digital form, it needs to pass through digital to analog converter 52 and normally an amplifier 53 and appropriate filtration and gain stages 54 before rendering as sound through loudspeaker 55 (or alternatively provided on headphone/line output 56). Functions such as play, stop, rewind and fast forward are provided by conventional circuitry from manual switches 57 Recording at the sound reproduction device requires additionally microphone input 59, an analog to digital converter 58 and means to write to the memory in die 16. A power source for the sound reproduction device 4 is also needed, though not shown here (this may be a battery, for example). No separate power source is required for the electronic storage device, as it does not need to draw power except when connected to the sound reproduction device, which provides the power. Sound compression and decompression can also be used to maximise storage efficiency: a separate stage for decompression of stored data can be provided before digital to analog conversion (and likewise after analog to digital conversion on recording) with conventional technology.

Figure 5:
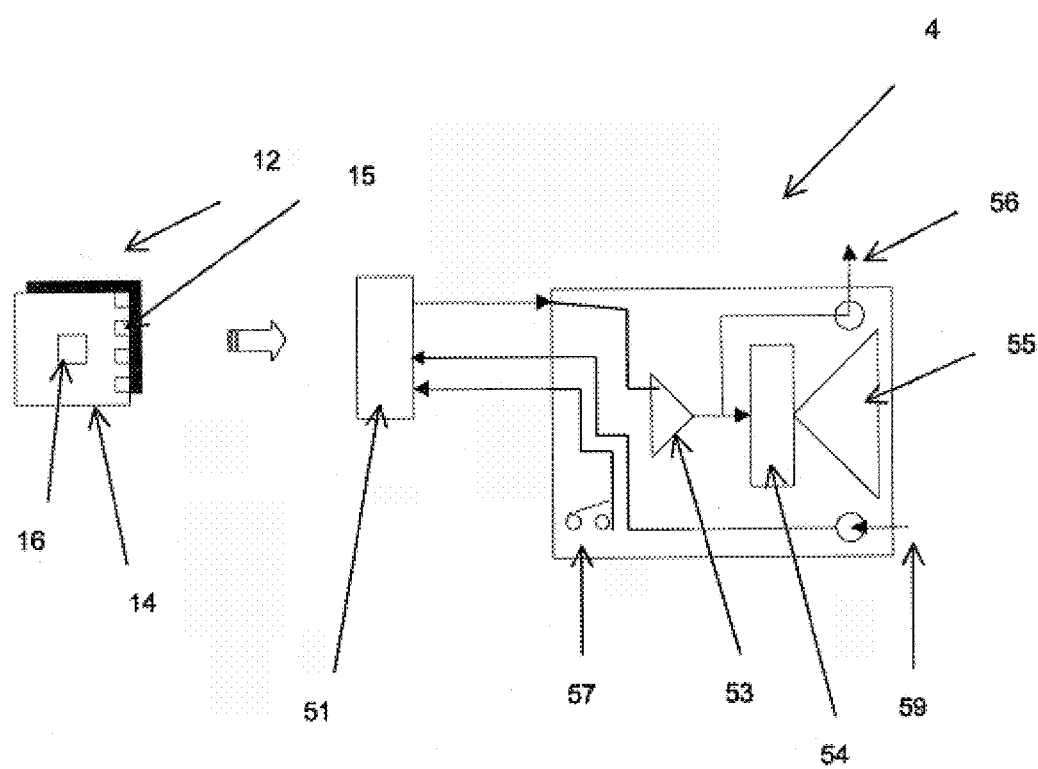
FIG. 5 shows schematically the components required for playback of a passage of sound held on an electronic storage medium as an analog signal in ax example of a system as shown in FIG. 1.

An analog sound storage solution is shown in FIG. 5. The arrangement of FIG. 5 is substantially similar to that of FIG. 4, and equivalent components are given the same reference numbers and are not described further here. In the analog case, no digital to analog converter 52 (or analog to digital converter on recording) is required: only a buffer (not shown) is required before amplifier 53. An appropriate analog storage technology is the ChipCorder technology of Information Storage Devices, Inc. (ISD), which provides a true quantised multilevel representation of the sample per cell. In this case the electronic storage device 12 is preferably again a CMOS device with an on-chip oscillator and high density multilevel EEPROM (such as ChipCorder, discussed above) storage array; an antialiasing filter and a smoothing filter will also be required in the overall circuitry. Connection choices in supply of power and signals can be as for the digital case.

In a particularly useful development of the above arrangements, further information beyond simply the passage of sound may be recorded in the memory on electronic storage device 12. Clearly, this is particularly appropriate where sound is stored digitally on electronic storage device 12. Such information could be entered and recorded at camera 1 (this may include information such as the time of recording) or may contain extensive annotation or other information provided at personal computer 2, sound reproduction device 4, or elsewhere: such information may be provided as a text file, or in an appropriate file format Examples of particular additional information, and the consequent advantages, will now be discussed.

It is particularly advantageous for the memory of the electronic storage device 12 to be recorded with a representation of the image to which it is (or is to be) attached—this enables the image to be recreated if, for example, the printed image is damaged. This could be, for example, the image represented as a GIF file. This image could be provided as a full representation of the original image (to allow recreation as discussed above) but could also be provided as a thumbnail for use as a low cost method of identifying the sound clip. Provision of such additional information makes it strongly advantageous for sound reproduction device 4 to also contain a display (not shown). This display may be adapted to show some or all of the additional information recorded in the memory, possibly including a representation of the image itself.

Additional information associated with the actual capture of the image is most easily provided at the camera itself. Date and time information and camera settings are typically available electronically within a conventional digital camera, so it is therefore straightforward for these to be recorded together with the sound clip. Location could be recorded either by user input, or conceivably by means of a GPS receiver or similar location sensing means within the camera itself. Audio settings could be recorded in a similar manner to camera settings. User annotation could also be provided at this point.

Other information types that could be provided would more typically be added in processing of an image at personal computer 2. A particularly useful indication is a reference to an archive (for example of an image of full quality, if only a thumbnail or no image is recorded on the audiotab—such an archive reference might be in the form of a web URL, a personal computer directory, or a flash card number. A further possibility would be the provision of images related to the printed image, as well as (or instead of) the image of the printed image itself. The further information could include a video clip, perhaps a video clip to which the image of the printed image acted as a reference image. Other information added could be information to assist in searching, such as classification of the image by type (for example, identifiers for the captured scene) or of the audio by type (for example, speech or ambient sound), or simply to identify relevant or associated material (again, a web URL on the public internet for a site associated with the captured scene). Other information typically added at the personal computer point could be related to security, or other forms of control (for copyright licensing purposes, for example)—such information could be a total number of copies of the data allowed, or text information indicating the copyright owner. The sound reproduction device 4 would again be an appropriate place to add information, particularly annotation by the viewer of the image.

What is claimed is:

1. A printer, comprising:
   an information input, adapted so that the printer can receive first information defining a visual image and second information defining a passage of sound;
   a printer element for printing the first information as a printed image on a sheet of paper; and
   a writing element for writing the second information into an electronic storage device, said electronic storage device adapted for attachment to the sheet of paper after being written.

2. A printer as claimed in claim 1, further comprising an attachment mechanism for attaching, an electronic storage device with second information stored thereon to the sheet of paper.

3. A printer as claimed in claim 2, wherein said attachment mechanism operates automatically on the operation of the printer element and the writing element to produce a printed image and an associated electronic storage device.

4. A printer as claimed in claim 1, further comprising a delivery mechanism for storing a plurality of unwritten electronic storage devices and for delivering a stored unwritten electronic storage device to the writing element when required thereby.

5. A printer as claimed in claim 4, wherein said unwritten electronic storage devices are provided on a bandolier.

6. A printer as claimed in claim 4, wherein said unwritten electronic storage devices are provided on a bandolier.

7. A printer as claimed in claim 4, further comprising an attachment mechanism for attaching an electronic storage device with second information stored thereon to a corresponding sheet of paper, wherein said unwritten electronic storage devices are provided with an adhesive surface which is uncovered for adhesion to a surface of the corresponding sheet of paper between storage in the delivery mechanism and attachment at the attachment mechanism.

8. A printer as claim in claim 7, wherein said attachment mechanism operates automatically on the operation of the printer element and the writing element to produce a printed image and an associated electronic storage device.

9. A printer as claimed in claim 1, wherein the printer is further adapted to copy first information from a printed image and to copy second information from an electronic storage device associated with the printed image, and thereby to provide a copied combination of printed image and electronic storage device with a sound passage stored thereon.

10. A printer as claimed in claim 1, wherein the printer is selectably adapted to write sound information on to a electronic storage device without printing a corresponding printed image.

11. A printer as claimed in claim 1, wherein each electronic storage device.

12. A printer as claimed in claim 1, adapted to write, together with the second information, third information relevant to the image or to the passage of sound into an electronic storage device.

13. A printer as claimed in claim 12, wherein the third information comprises a version of the image.

14. A printer as claimed in claim 12, wherein the third information is received through the information input.

15. A printer as claimed in claim 12, wherein the third information is received through a user input mechanism at the printer.

16. A printer as claimed in claim 12, wherein the printer has a display, and is adapted to display a part of the third information for a selected electronic storage device.

17. A printer as claimed in claim 1, wherein the printer element is an inkjet printer mechanism.

18. A printer as claimed in claim 1, wherein the printer element is a laser printer mechanism.

19. A printer as claimed in claim 1, wherein the printing of the first information and the writing of the second information occurs in a single, contemporaneous printing and writing operation in the printer.

20. A printer as claimed in claim 1, wherein the printer is adapted as a document printer.

21. A printer as claimed in claim 20, wherein the printer is a personal printer.

22. A printer as claimed in claim 20, wherein the printer is a network printer.

23. A method of preparing an image printed on an image bearing sheet in combination with an electronic storage device for storing a passage of sound comprising the steps of:
   with a printer element, printing the image on the image bearing sheet;
   writing the sound passage into the electronic storage device; and
   after the step of writing the sound passage into the electronic storage device, attaching the electronic storage device to the image bearing sheet.

24. The method of claim 23 further comprising:
   inputting into a printer first information defining the image;
   inputting second information defining the sound passage to a writing element; and
   writing the sound passage from the writing element to the electronic storage device.

25. The method of claim 24 wherein the printing of the image is done in a printer and further comprising providing the writing element integrally in the printer.

26. The method of claim 24 further comprising:
   providing an attachment mechanism for attaching the electronic storage element to the image bearing sheet; and
   with the attachment element attaching the electronic storage element with second information stored thereon to the image bearing sheet.

27. The method of claim 26 wherein the attachment mechanism operates automatically on the operation of the printer element and the writing element to produce a printed image on an image bearing sheet and an associated written electronic storage device attached to the image bearing sheet.

28. The method of claim 26 further comprising providing the attachment mechanism integrally in the printer and attaching the electronic storage device with second information stored thereon to the image bearing sheet.

29. The method of claim 28 further comprising exit feeding the combined image bearing sheet with the written electronic storage device attached thereto for access by a user.

30. The method of claim 24 further comprising:
providing a delivery mechanism for storing a plurality of unwritten electronic storage devices and for delivering a stored unwritten electronic storage device to the writing element upon activating a command to write on an electronic storage device; and
writing on the electronic storage device that has been delivered to the writing element.

31. The method of claim 24 wherein the delivery mechanism stores the unwritten electronic storage devices for serial delivery to the writing element.

32. The method of claim 31 further comprising storing the unwritten electronic storage devices on a bandolier.

33. The method of claim 31 further comprising storing the unwritten electronic storage devices in a cartridge.

* * * * *

UNITED STATES PATENT AND TRADEMARK OFFICE
CERTIFICATE OF CORRECTION

PATENT NO. : 6,563,563 B2
DATED : May 13, 2003
INVENTOR(S) : Guy De Warrenne Bruce Adams et al.

It is certified that error appears in the above-identified patent and that said Letters Patent is hereby corrected as shown below:

Column 11,
Line 36, change "on a bandolier" to -- as cartridges --
Line 45, change "claim" to -- claimed --
Line 61, change "storage device" to -- storage device comprises an integrated circuit mounted on a substrate. --

Signed and Sealed this

Twenty-eighth Day of June, 2005

JON W. DUDAS
*Director of the United States Patent and Trademark Office*